United States Patent
Turner et al.

(10) Patent No.: US 7,522,884 B2
(45) Date of Patent: Apr. 21, 2009

(54) APPARATUS AND METHOD FOR ANALYZING DRIVE TEST DATA FOR COMMUNICATIONS SYSTEM

(76) Inventors: Clay S. Turner, 130 Jade Cove Dr., Roswell, GA (US) 30075; Christopher J. Hall, 424 Bridgetown Ct., Satellite Beach, FL (US) 32937

( * ) Notice: Subject to any disclaimer, the term of this patent is extended or adjusted under 35 U.S.C. 154(b) by 581 days.

(21) Appl. No.: 11/105,184

(22) Filed: Apr. 13, 2005

(65) Prior Publication Data
US 2005/0251363 A1    Nov. 10, 2005

Related U.S. Application Data

(60) Provisional application No. 60/561,870, filed on Apr. 13, 2004.

(51) Int. Cl.
*H04B 17/00* (2006.01)
(52) U.S. Cl. .............. 455/67.11; 455/67.13; 455/67.14; 455/423

(58) Field of Classification Search ............. 455/67.11, 455/423, 424, 115.1, 226.1, 67.13, 67.14
See application file for complete search history.

(56) References Cited

U.S. PATENT DOCUMENTS

| 6,987,968 B2 * | 1/2006 | Iyer | 455/423 |
| 2002/0058503 A1 * | 5/2002 | Gutowski | 455/423 |

* cited by examiner

*Primary Examiner*—Tuan A Pham
(74) *Attorney, Agent, or Firm*—John L. DeAngelis; Beusse Wolter Sanks Mora & Maire P.A.

(57) ABSTRACT

A data check tool useful for processing drive test data for assessing performance of a communications system. After (or during) test data collection, the data check tool processes the test data to determine whether the collected test data meets the requirements of a previously identified list of desired test data. The tool also determines whether the test data was collected using the correct test equipment and whether the test equipment was properly configured during the data collection process.

11 Claims, 2 Drawing Sheets

APPARATUS AND METHOD FOR ANALYZING DRIVE TEST DATA FOR COMMUNICATIONS SYSTEM

This application claims the benefit of U.S. Provisional Patent Application No. 60/561,870 filed on Apr. 13, 2004.

FIELD OF THE INVENTION

The present invention relates generally to processing test data, and more specifically to post-processing of test data collected during a drive test of a radio frequency communications system coverage area.

BACKGROUND OF THE INVENTION

The RF (radio frequency) engineering of cellular, PCS (personal communications system) and other communications systems uses both predicted and measured system performance data. Predicted data is developed using known software tools or toolsets that model the RF properties of the communications system. Measured or test data is collected from either stationary equipment at one or more fixed sites (e.g., cell sites) within the coverage area or from portable or mobile test equipment that is driven about the coverage area while collecting system performance data. Certain system metrics are derived by processing the collected data.

Data collected by the portable equipment is referred to as "drive test data." To conduct a drive test, one or more technician teams drive the coverage area while collecting measurement data using various known types of signal receiving and processing equipment. The collected and derived data can include, for example, S/N ratio, signal strength and bit error rate for each system channel, as well as GPS time and location. Those skilled in the art recognize that other data types may be collected or derived as determined by the nature of the communications system and operational difficulties that might be expected or have been observed during system operation.

Since there are multiple manufacturers of drive test data collection equipment and therefore multiple presentations of the collected data, a generic method for analyzing, checking, tabulating, combining, etc. the data, is desired. Post-processing tools are designed to perform these functions. Since the volume of the collected data is typically enormous (a single drive test about a coverage area may extend over several days), post processing should preferably also identify the most important data elements and segregate the collected data into subsets for easier display and analysis by the RF engineer responsible for system operation.

The collected data is stored or logged into files as collected. Early detection of problems with the drive test data is not possible, since currently available post-processing tools do not permit examination of the data for completeness and/or consistency until after the collection process is over. A drive test data collection problem may arise when an inexperienced drive team collects insufficient data or wrong data, or when the technician changes an equipment configuration during the collection process without corresponding modifications to the data collection equipment. Post-processing analysis may reveal such problems with the collected data, but they can be remedied only by collecting additional data during another drive test. Generally, it is not desired to conduct a second drive test after the first test has been completed due to the inconvenience and extra cost incurred.

Current post-processing tools also do not compare test data stored in different collection files. The results of such a comparison may be useful in identifying inconsistencies in the collected data or problems with the drive test collection equipment.

BRIEF SUMMARY OF THE INVENTION

According to one embodiment, the present invention comprises a method for analyzing a communications system in response to collected performance data collected by test equipment transported within a coverage area of the communications system. The method further comprises determining desired performance data to be collected; determining whether certain attributes of the collected performance data are consistent with other attributes of the collected performance data; and comparing the collected performance data and the desired performance data.

According to another embodiment, the invention comprises a computer system further comprising: a processor; a display; a communications component for receiving communications system test data, wherein the processor processes the test data; a display interface for allowing a user to define display parameters relative to the test data, wherein the processor causes elements of the test data to be displayed on the display according to the display parameters; an analysis interface for allowing the user to define analysis parameters for the test data, wherein the analysis parameters comprise a data consistency determination, wherein the processor determines whether the test data satisfies the analysis parameters; and an advisory component for advising a user in the event the processor determines that the test data does not satisfy the analysis parameters.

BRIEF DESCRIPTION OF THE DRAWINGS

The present invention can be more easily understood and the further advantages and uses thereof more readily apparent, when considered in view of the following detailed description when read in conjunction with the following figures, wherein.

In accordance with common practice, the various detailed features are not drawn to scale, but are drawn to emphasize specific features relevant to the invention. Like reference characters denote like elements throughout the figures and text.

DETAILED DESCRIPTION OF THE INVENTION

Figure 1:
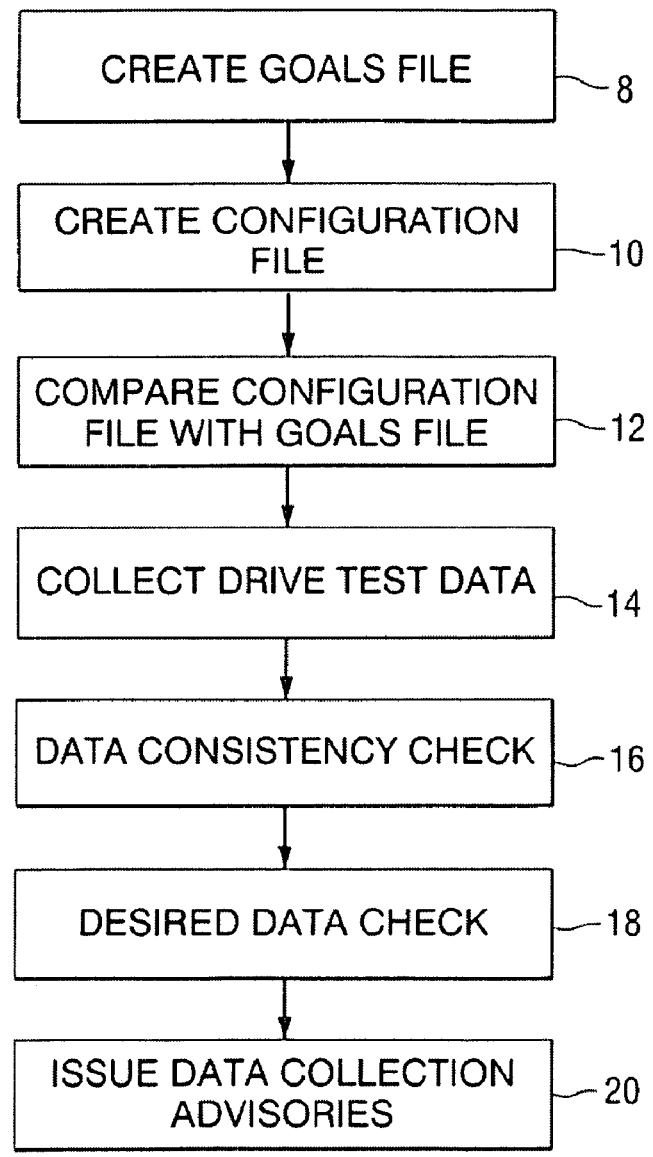
FIG. 1 illustrates operation of the present invention in schematic block diagram form.

Before describing in detail the particular method and apparatus for analyzing drive test data for a communications system according to the teachings of the present invention, it should be observed that the present invention resides primarily in a novel combination of hardware and software elements. Accordingly, so as not to obscure the disclosure with details that will be readily apparent to those skilled in the art having the benefit of the description herein, in the description that follows certain hardware and software elements have been described with lesser detail, while the drawings and specification describe in greater detail other elements and steps pertinent to understanding the invention. The following embodiments are not intended to define limits as to the structure or method of the invention, but only to provide exemplary constructions. The embodiments are permissive rather than mandatory and illustrative rather than exhaustive.

The present invention teaches a data check tool (also referred to as a data checker) that in one embodiment functions as a subset of the post-processing equipment, offering an advantageous process and apparatus, not heretofore available in the art, for analyzing the collected performance data. Alternatively, the data check tool can operate as a standalone tool in conjunction with the drive test equipment for processing the drive test data as it is being collected.

The tool of the present invention performs several unique and non-obvious functions. According to one embodiment, the present invention allows the drive test planner to create a goals file (see a step 8 of FIG. 1) that defines the test devices, configurations and settings for each test device and the drive test data to be collected. This information is created prior to beginning the drive test and the file can be stored within the data check tool. The goals file should be distributed to each drive test team before the data collection process begins to ensure the use of correct test equipment and proper configuration of the test equipment. As described below, the teams can also easily test the collected data against the desired data after only a few minutes of data has been recorded. Thus a redrive of the coverage area will likely be avoided.

After the technician has configured the test devices as set forth in the goals file, but prior to beginning the drive test, the data check tool creates a configuration file (a step 10 of FIG. 1) describing the device configurations as set by the technician. At a step 12, the contents of the configuration file are compared with the configurations set forth in the goals file to confirm that the test devices have been properly configured. If the comparison identifies a configuration problem the technician checks the device configurations.

The data checker of the present invention further comprises a data consistency check. As the drive test data is collected at a step 14, all of the data many not be stored in a single file. Hence a complete set of drive test data extends across multiple files. Additionally, the files may be collected by one or more drive test teams. A consistency check step 16 examines two or more files (whether collected by the same team or different teams), including attributes of the data collected and stored within the file and attributes of the test equipment, to detect and display (in one embodiment) all data and test equipment inconsistencies. The inconsistent results are made available to the drive test team(s). For example, at the end of a test day all collected data from all the drive teams is processed through the data consistency checking process. The teams are made aware of the data inconsistencies and during a subsequent testing can recollect test data related to the inconsistent data, verifying that the inconsistencies are related to a network problem or that they were created by a data collection problem, for example, a change in the test equipment configuration.

Advantageously according to the present invention, the cause of a data inconsistency can be determined prior to completing the drive test, allowing the test technicians to collect additional data to overcome the inconsistencies. For example, if two S/N readings taken at the same location differ significantly, the cause may be a change in a test equipment configuration between the time of the two readings and not a problem with the communications system. When alerted to this problem, the test teams can first check the test equipment and then conduct a retest. If the results are unchanged, then likely the discrepancy reveals a problem with the communications system. The data checker also identifies, based on statistical and numerical analyses, test data files that contain suspect test data and ignores these files during post processing.

After the drive test has been completed (or at any time during the drive test), the data checker compares the collected data with the data collection objectives set forth in the goals file to determine whether the data collection objectives have been satisfied. See a step 18 of FIG. 1.

At this step, the data checker may also determine that the proper test equipment (and properly configured) was employed to collect the test data. A goals/difference table can be generated that succinctly identifies the differences between the test goals and the collected data (and test equipment variances) as set forth in one or more test data files. After evaluation by the drive test planner, certain differences may be deemed innocuous, and the test data from such files is processed by the data checker and included within the compiled test results for the communications system. Other inconsistent files may be ignored and not further processed due to the identified inconsistencies in the test data or the test equipment employed to collect the test data.

As shown in FIG. 1 at a step 20, data advisories resulting from the data consistency check 16 and desired data check 18, are issued to the drive test team by the data checker of the present invention.

The data checker of the present invention can process the collected data concurrently with the collection process, immediately alerting the drive test team to problems. Alternatively, the data checker can process the data at the conclusion of each drive test day. In the latter situation the next drive test day can be designed to overcome any problems identified with the previously collected data. Drive test data can be exported to an Excel® file for further evaluation.

Figure 2:
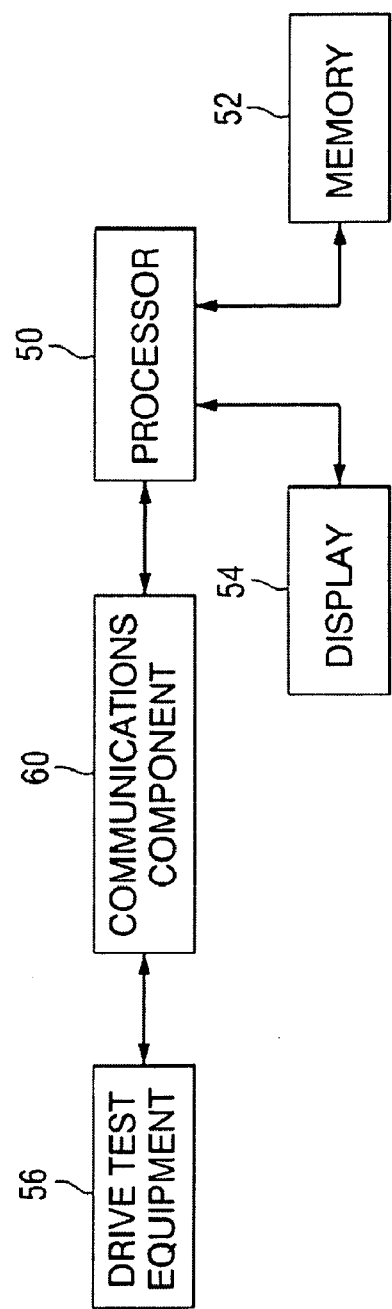
FIG. 2 illustrates a block diagram of elements for performing the data analysis of the present invention.

The schematic diagram of FIG. 1 is implemented in one embodiment in a processor 50 (see FIG. 2) and an associated memory 52 separate from the drive test equipment and/or an element of the drive test equipment. The processor 50 further controls a display 54 and receives data collected by drive test equipment 56 via a communication component 60. In this embodiment, the FIG. 1 steps are implemented by program code statements stored in the memory 52 and operable in the processor 50. When implemented in the processor 50, program code configures the processor 50 to create logical and arithmetic operations to execute the steps. The invention may be embodied in the form of computer program code written in any of the known computer languages containing instructions embodied in tangible media such as floppy diskettes, CD-ROM's, hard drives, DVD's, removable media or any other computer-readable storage medium. When the program code is loaded into and executed by a general purpose or a special purpose computer comprising the processor 50 and the memory 52, the computer becomes an apparatus for practicing the invention.

The invention can also be embodied in the form of a computer program code, for example, whether stored in a storage medium loaded into and/or executed by a computer or transmitted over a transmission medium, such as over electrical wiring or cabling, through fiber optics, or via electromagnetic radiation, wherein when the computer program code is loaded into and executed by a computer, the computer becomes an apparatus for practicing the invention.

While the invention has been described with reference to preferred embodiments, it will be understood by those skilled in the art that various changes may be made and equivalent elements may be substituted for elements thereof without departing from the scope of the invention. The scope of the present invention further includes any combination of the elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A method for collecting and analyzing performance measurements collected by a plurality of drive test teams using test equipment transported within a coverage area of a communications system, the method comprising:
    prior to collecting the performance measurements, creating a goals file comprising one or more of test equipment to be used for collecting the performance measurements, desired configuration settings for the test equipment and the performance measurements to be collected;
    distributing the goals file to each drive test team;
    collecting the performance measurements;
    determining whether certain collected performance measurements are consistent with other collected performance measurements by comparing the performance measurements collected by a first drive test team at a first time with the performance measurements collected by the first drive test team at a second time different from the first time, and by comparing the performance measurements collected by all teams; and
    comparing the collected performance measurements and the desired performance measurements.

2. The method of claim 1 executed by a component of the test equipment.

3. The method of claim 1 further comprising:
    determining actual configuration settings for the test equipment;
    comparing the desired configuration settings with the actual configuration settings; and
    issuing an advisory when the comparing step indicates a difference between the desired settings and the actual settings.

4. The method of claim 1 further comprising issuing an advisory in response to the step of comparing.

5. The method of claim 1 further comprising excluding from analysis certain collected performance measurements in response to one or more of the step of determining and the step of comparing.

6. The method of claim 1 wherein the steps of determining and comparing are executed as the collected performance data is collected.

7. The method of claim 1 wherein the steps of determining and comparing are executed after the collected performance data has been collected.

8. A computer program product for collecting and analyzing performance measurements collected by a plurality of drive test teams using test equipment transported within a coverage area of a communications system, the computer program product comprising:
    a computer usable medium having computer readable program code modules embodied in the medium for collecting and analyzing the performance measurements of the communications system;
    a computer readable first program code module comprising a goals file, further comprising one or more of test equipment to be used for collecting the performance measurements, desired configuration settings for the test equipments and the performance measurements to be collected;
    a computer readable second program code module for storing collected performance measurements of the communications system;
    a computer readable third program code module for determining whether certain collected performance measurements are consistent with other collected performance measurements by comparing the performance measurements collected by a first drive test team at a first time with the performance measurements collected by the first drive test team at a second time different from the first time, and by comparing the performance measurements collected by all teams;
    a computer readable fourth program code module for comparing the collected performance measurements the desired performance measurements; and
    a computer readable fifth program code module for advising results of the third and the fourth program code modules.

9. The computer program product of claim 8 further comprising a sixth program code module for issuing an advisory to a user in response to one or both of the third program code module and the fourth program code module.

10. An apparatus comprising:
    a storage device for storing a goals file, the goals file comprising test equipment to be used for collecting performance measurements, desired configuration settings for the test equipment and desired performance measurements to be collected and for storing performance measurements collected by a drive test team during a drive test;
    a display;
    a communications component for receiving performance measurements collected by from other drive test teams;
    a display interface for allowing a user to define display parameters for displaying performance measurements
    an analysis device for comparing the performance measurements collected and the desired performance measurements to be collected, for comparing the performance measurements collected by a first drive test team at a first time with the performance measurements collected by the first drive test team at a second time different from the first time and for comparing the performance measurements collected by all drive test teams; and
    an advisory component for advising a user of the results of the comparison process of the analysis device.

11. The apparatus of claim 10 wherein the performance measurements are collected by test equipment according to test equipment configurations, and wherein the analysis device determines a relationship between the test equipment used to collect the performance measurements and the test equipment to be used for collecting the performance measurements and between the test equipment configurations and the desired configuration settings.

* * * * *